No. 759,635. PATENTED MAY 10, 1904.
T. F. ROWLAND.
WELDING APPARATUS.
APPLICATION FILED JUNE 27, 1901.
NO MODEL. 6 SHEETS—SHEET 2.

Witnesses:
Raphael Netter
Alexander Mitchell

Thomas F. Rowland Inventor
by Frederick S. Lanman Att'y

No. 759,635. PATENTED MAY 10, 1904.
T. F. ROWLAND.
WELDING APPARATUS.
APPLICATION FILED JUNE 27, 1901.
NO MODEL. 6 SHEETS—SHEET 3.

Fig. 4

No. 759,635. PATENTED MAY 10, 1904.
T. F. ROWLAND.
WELDING APPARATUS.
APPLICATION FILED JUNE 27, 1901.
NO MODEL. 6 SHEETS—SHEET 4.

Witnesses:
Raphaël Netter
Alexander Mitchell

Thomas F. Rowland, Inventor
by Frederick S. Duncan, Att'y

No. 759,635. Patented May 10, 1904.

UNITED STATES PATENT OFFICE.

THOMAS F. ROWLAND, OF NEW YORK, N. Y.

WELDING APPARATUS.

SPECIFICATION forming part of Letters Patent No. 759,635, dated May 10, 1904.

Application filed June 27, 1901. Serial No. 66,220. (No model.)

*To all whom it may concern:*

Be it known that I, THOMAS F. ROWLAND, a citizen of the United States, residing in the borough of Manhattan, city of New York, county and State of New York, have invented certain new and useful Improvements in Welding Apparatus, of which the following is a specification, reference being had to the drawings accompanying and forming part of the same, in which the same reference characters refer to similar parts throughout the several figures.

Figure 1:
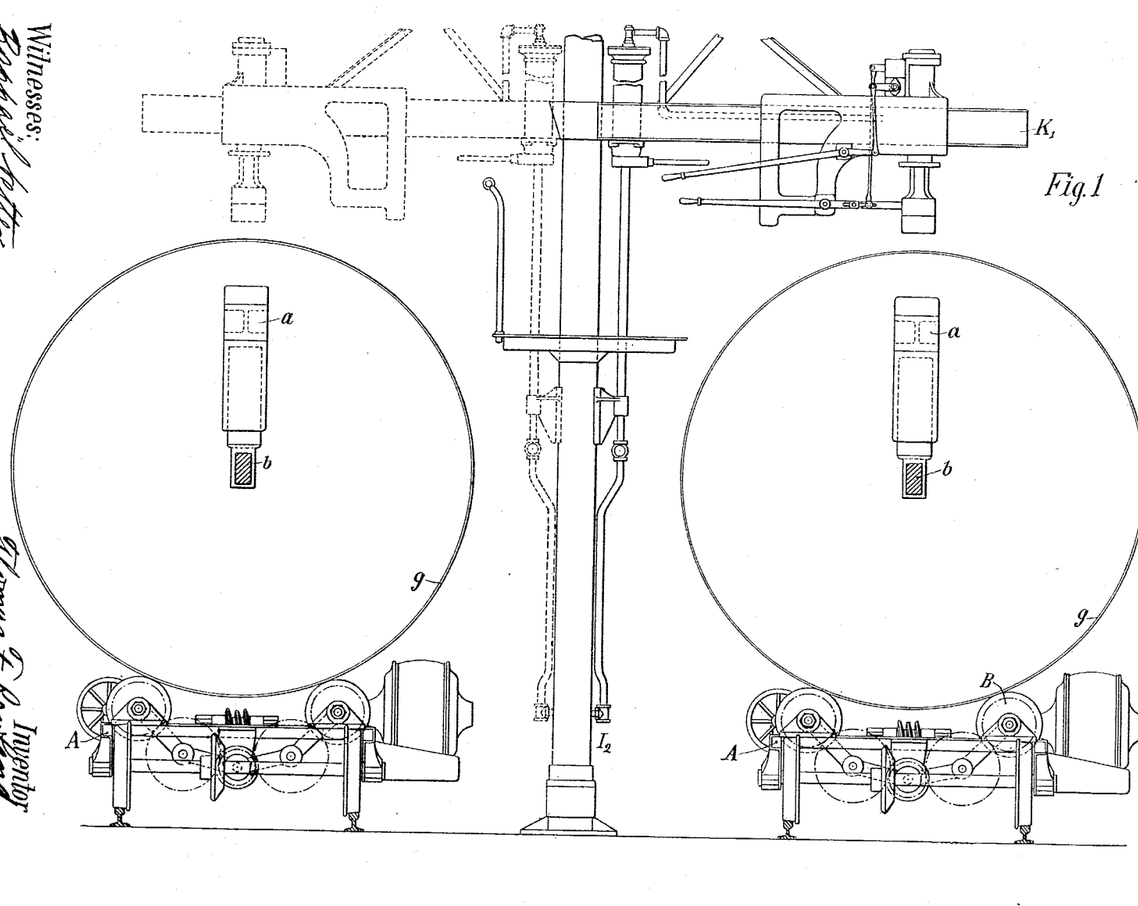
Figure 1 is a general view of my welding apparatus.

In general terms my welding apparatus comprises a suitable truck A, which in combination with a suitable trailer-truck, serves to rotate and to move large cylindrical tubes into proper relation with my air-hammer and air-anvil, both of which are removably mounted and the air-hammer being so arranged that it can operate upon two tubes alternately, as is indicated in Fig. 1.

*Electric truck.*—Stated in general terms my truck consists of a suitable body upon which is mounted an electric motor or other driving mechanism which by suitable clutches can actuate either the traction-wheels of the truck to drive the same along the track upon which it runs or which can drive suitable work-revolving or traverse rolls upon which the cylindrical piece of work is supported.

Figure 7:
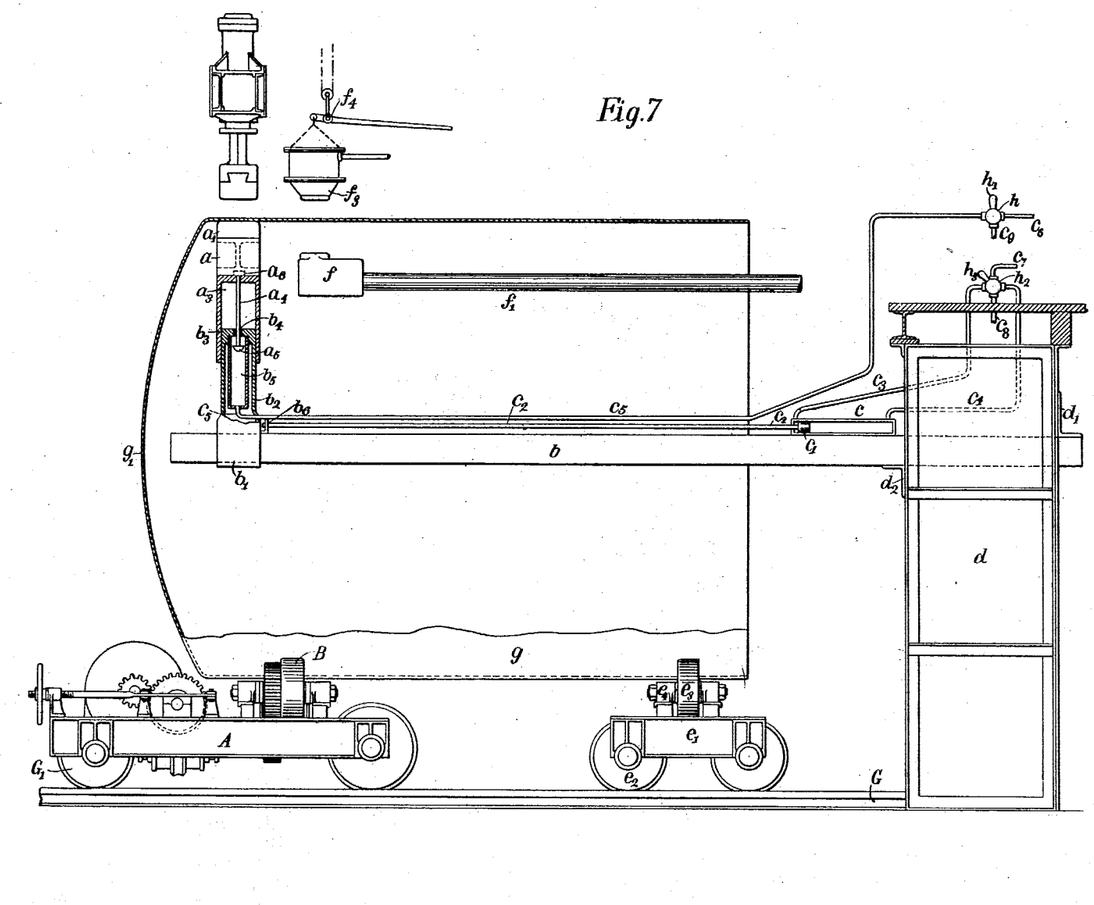
Fig. 7 is a side view, partly in section, of my welding mechanism.

As will be readily seen by reference to Fig. 7, the trailer-truck $e'$ has two pairs of supporting-wheels $e^2$, revolubly mounted upon the frame of the truck, and also is provided with two work-supporting rolls $e^3$, which are loosely mounted upon the frame, so that they can readily revolve. The cylindrical piece of work $g$ is supported upon the rolls $e^3$ and upon the rolls B on my electric truck. The function of the trailer is to support one end of the work as the trailer moves along the track G in unison with the electric truck, and the freely-rotating work-supporting rolls $e^3$ allow the rotation of the work under the influence of the work-revolving or traversing rolls B of the electric truck. The trailer acts in conjunction with the electric truck, and, indeed, the trailer might be replaced by another electric truck similar to the one which will now be described.

Figure 2:
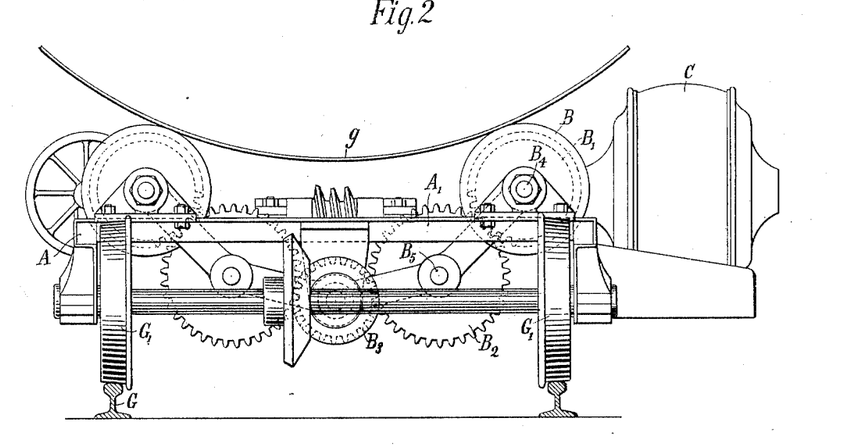
Fig. 2 is an end view of a truck comprising part of my invention.
Figure 3:
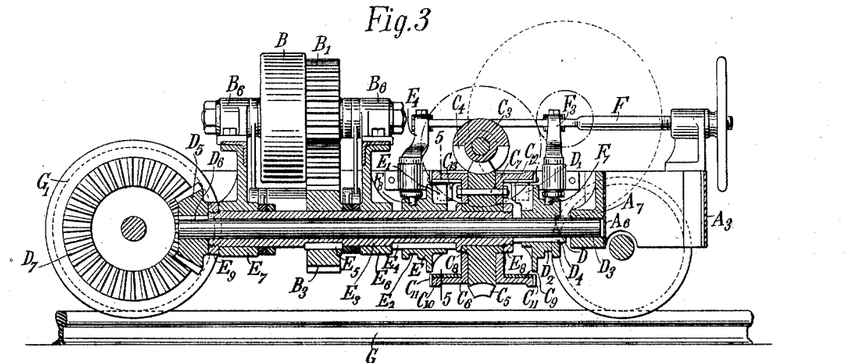
Fig. 3 is a longitudinal sectional view of said truck.
Figure 4:
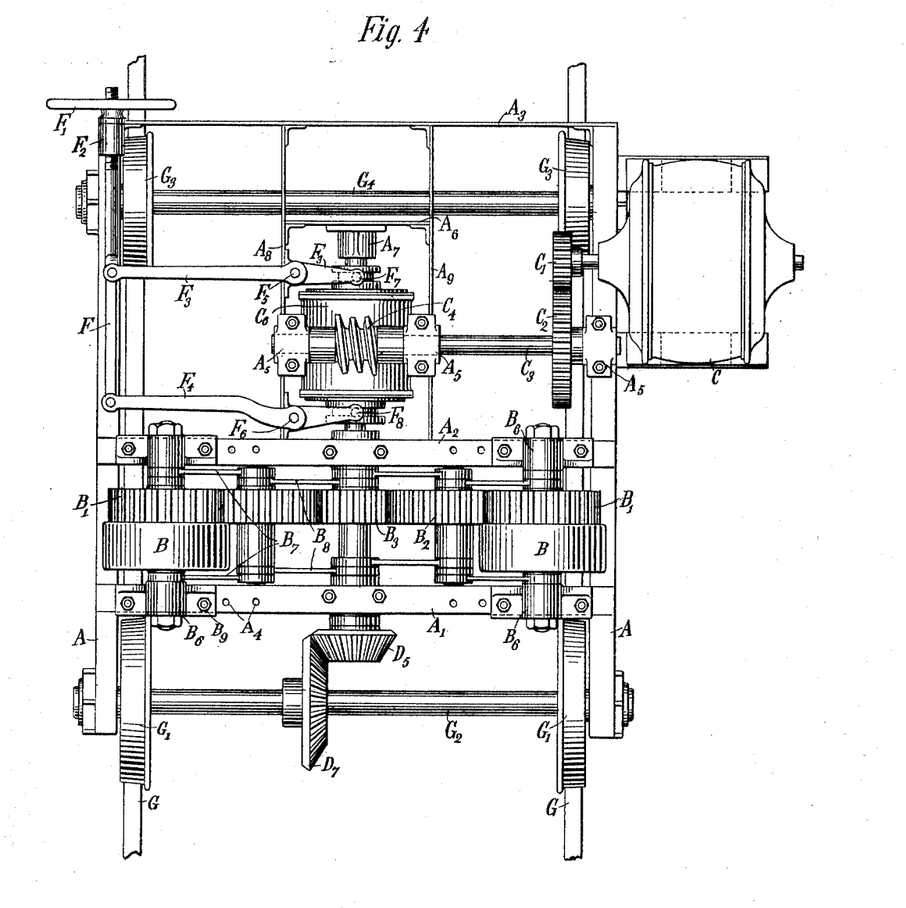
Fig. 4 is a plan view of the same.
Figure 5:
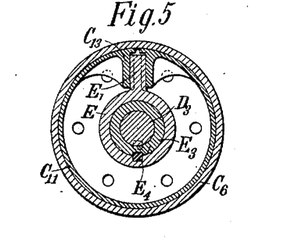
Figs. 5 and 6 are detail views showing the clutch employed in my truck.
Figure 6:
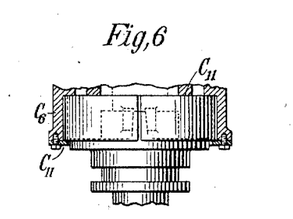

The electric truck has a framework composed of two side members A and the transverse members A', $A^2$, $A^3$, and $A^6$, the last member of which is supported by the short longitudinal members $A^8$ and $A^9$. The electric motor or other suitable motor or driving mechanism C is mounted on the framing-piece A, so as to extend to one side of the truck. I prefer to employ an electric motor of the well-known two-phase type of common construction, which will not be described in detail here. The motor, of course, can be readily started, stopped, and reversed by suitable and well-known switches controlling the current supplied thereto, and any other driving means that might be employed would also be governed in a similar manner, so that it could be started, stopped, and reversed at will. Upon the driving-axle of the motor is secured the gear C', which meshes with the gear $C^2$ upon the shaft $C^3$, which is supported in suitable bearings $A^5$, secured to the framework of the truck. The worm $C^4$ is secured to the shaft $C^3$ and meshes with the worm-wheel $C^5$, secured to the clutch-drums $C^6$ by suitable bolts $C^7$, as shown in Fig. 3. The clutch-drums extend on either side of the worm and are provided with cylindrical flanges extending laterally, with which the split rings $C^9$ and $C^{10}$ engage internally. These rings are held in place in engagement with the inner surface of the clutch-drums $C^6$ by the inwardly-projecting flanges $C^{11}$, which are bolted to the edges of the drums. (See Fig. 6.) The worm-wheel has a central hub $C^8$, which is loosely mounted upon the sleeve $E^3$ and is held thereon by a suitable collar on the inner side of the sleeve and by the collar $E^8$, screwed upon the end of the same. This hollow sleeve $E^3$ is mounted in the bearings $E^6$ and $E^7$, secured to the transverse members $A'$ and $A^2$ of the frame of the truck, and the collar $E^9$, screwed upon the end of this sleeve, prevents any longitudinal motion of the same. The spur-gear $B^3$ is keyed to the sleeve by the key $E^5$. There is also secured to the sleeve the traverse-clutch $E$, which is splined to it by the key $E^4$, so that this clutch $E$ may move longitudinally of the sleeve, but cannot rotate with respect to the same. This traverse-clutch by means of a wedge $E'$, formed integrally therewith, engages the split ring $C^{10}$, and upon its being forced inward, so as to expand this ring by engaging with the shoulders $C^{13}$ upon the ends of the same, this ring is made to expand so as to grip the clutch-drum $C^6$ firmly, and thereupon the sleeve $E^3$ and the spur-gear $B^3$ are driven by the motor $C$. The gear $B^3$ is connected, through the intermediate gear $B^2$ upon the shaft $B^5$, with the gear $B'$, mounted upon the shaft $B^4$, which is held in suitable bearings $B^6$, bolted to the transverse frame members $A'$ and $A^2$, and since the gear $B'$ is fast to the traverse-roll $B$ on either side of the truck both of these traverse-rolls are driven whenever the motor $C$ operates, and the traverse-clutch $E$ is actuated at the same time. These traverse-rolls, as will be readily seen from Fig. 2, operate to rotate or traverse the cylindrical work mounted upon them, and since these rolls can be moved transversely of the truck and bolted to the transverse frame members $A'$ and $A^2$ at various distances from the center of the truck these rolls are adapted to support work of varying diameters. The bearings $B^6$ for these rolls are held to the frame members by the bolts $B^9$, and these bolts may be inserted in any one of the holes $A^4$ in the frame members, as will be seen from Fig. 4. The shafts $B^5$, upon which the intermediate gears $B^2$ are mounted, are supported by the toggle-levers $B^7$ and $B^8$, which are both connected with this shaft and also with the sleeve $E^3$ and the shafts $B^4$ on either side of the truck. In this way it will be seen that at whatever distance from the center of the truck the shafts $B^4$ are adjusted the intermediate gears $B^2$ will always remain in engagement. On the other side of the clutch-drum is situated the traction-clutch $D$, which engages in a similar manner with the split ring $C^9$. This traction-clutch is splined to the central shaft $D^3$ by the key $D^4$, so that it has longitudinal movement thereon. This shaft $D^3$ is mounted in a suitable bearing $A^7$, attached to the frame member $A^6$, and since it rotates within the hollow sleeve $E^3$ the other end is sufficiently supported. The outer end of this shaft has splined to it the beveled gear $D^5$, which meshes with the corresponding gear $D^7$ upon the shaft $G^2$, to which the two traction-wheels $G'$ are rigidly attached. So it will be readily seen that when the clutch $D$ is in engagement the traction-wheels are revolved, provided, of course, that the motor is in operation at this time, and the whole truck is moved along the track $G$, upon which it is supported, carrying the work with it. The two clutches $D$ and $E$ are operated by the clutch-operating rod $F$, which is given a longitudinal motion by the wheel $F'$, mounted in the bearing $F^2$, so that it may revolve therein, but so that it is prevented from moving longitudinally thereof. The hub of this wheel engages a suitable screw-thread cut upon the rod $F$, so that rotation of the wheel moves this rod longitudinally. The parts of the two clutch-levers $F^3$ and $F^4$ are rigidly attached to the small shafts $F^5$ and $F^6$, respectively, which revolve in suitable bearings attached to the frame member $A^8$. At the inner end of these levers the pins $F^7$ and $F^8$ are affixed, which engage annular grooves in the clutch members $D$ and $E$, so that movement of the clutch-wheel $F'$ moves both the clutch members $D$ and $E$ simultaneously in the same direction. These clutch members are so arranged also that when they are equidistant from the worm-gear $C^5$ both clutches are disengaged. If, however, the clutch-wheel is actuated, one of these clutches will be engaged, while the other is moved still further out of engagement. Therefore if the motor is running and one of the clutches—for instance, the traverse-clutch $E$—is in engagement to drive the traction-clutch will necessarily be out of engagement, so that there will be no movement of the truck along the track. This particular form of clutch which I have described has been found very efficient for this purpose. It engages and disengages readily, and, furthermore, the two clutch members grip strongly, so that a very great rotative effort is produced. These clutches, furthermore, are adapted to act as brakes when the motor is not running. For instance, if it is desired to hold the traverse-rolls so that they will not rotate the traverse-clutch can be thrown into operation while the motor is stopped. This will positively prevent any rotation of the work and secure the proper alinement of the same.

The operation of my truck is as follows: The cylindrical piece of work is mounted upon the truck and trailer, as shown in Fig. 1. When it is desired to move the work along the track upon which the trucks are mounted, the motor $C$ is operated so that it rotates in the desired direction, and then the hand-wheel $F'$ is rotated so that the traction-clutch $D$ is thrown into engagement. The motor, through its intermediate gearing, thereupon drives the traction-wheels $G'$, and the electric truck moves the work as far as it is desired along the track. The motor is then stopped, and if it is desired to hold the work in this position the traction-clutch is left in engagement, which effectively prevents any further movement of the work by blocking the traction-wheels. If it is desired to rotate or traverse the work about its axis, the clutch-wheel F' is so rotated that the traverse-clutch E is thrown into engagement, thereby disengaging the traction-clutch D, and then upon rotating the motor in the desired direction the work will be traversed to the extent desired, when either the stopping of the motor or the throwing out of the traverse-clutch will stop the further traverse of the work.

*Air-anvil.*—The air-anvil which I employ as part of my welding apparatus is movably mounted.

$d$ is a heavy supporting-column mounted upon a suitable foundation, and it carries the anvil-bar $b$, that is bolted to two brackets $d'$ $d^2$ on the supporting-column. If desired, the anvil-bar may be mounted so as to be adjusted vertically by securing $d'$ $d^2$ to $d$ at the height desired, or it may move in any manner instead of being fixedly supported, and moving means may also be provided. The anvil-bar $b$ is of preferably rectangular cross-section, as is shown in Fig. 1, and near the outer end of the same the anvil-support $b'$ is mounted so as to slide upon the anvil-bar, the portion $b^2$, which is cylindrical, projecting at right angles to the bar in a vertical position. The anvil-cylinder $b^3$ fits about the cylindrical portion $b^2$ of the support, so as to form a chamber $a^3$ within the cylinder. The anvil-block $a$ is rigidly attached to the anvil-cylinder and supports at its upper end the head $a'$, which is connected to the block in any suitable way.

Within the anvil-support is formed a cylinder $b^5$, the interior of which communicates with a passage $b^4$ in the upper end $b^3$ of the support.

$a^4$ is a valve-rod, having a cut-off valve $a^5$ thereon arranged to close the passage $b^4$ when the anvil-cylinder has moved as far as is desired on the support, since this valve cuts off at that time any further communication between the cylindrical chamber $b^5$ and the anvil-cylinder.

$a^6$ is a nut locking the valve-rod $a^4$ to the anvil-cylinder.

$c^5$ is a pipe communicating with the chamber $b^5$ and leading to a three-way-valve casing $h$, connected to discharge-pipe $c^9$ and a supply-pipe $c^6$, the lever $h'$ being connected with the valve within the casing $h$.

The support-cylinder $c$ is rigidly attached to the anvil-bar, and the piston $c'$ reciprocates within it. The piston-rod $c^2$, secured to the piston $c'$, is connected with the bracket $b^6$, attached to the anvil-support $b'$. Suitable pipes $c^3$ $c^4$ connect either end of the cylinder $c$ with the valve-casing $h^2$. $c^7$ is a supply-pipe for this valve-casing, and $c^8$ a discharge-pipe.

$h^3$ is a suitable lever connected with the valve within the casing and arranged to either admit or discharge fluid from either end of the cylinder.

Upon a suitable track G, I have shown a trailer-truck $e'$ and one of my special electric trucks A, supporting a large cylinder $g$, having a curved end $g'$. In this manner the cylinder can be moved along the track parallel to the anvil-bar and can also be revolved about its axis, as I have already explained in detail.

I have shown diagrammatically a gas-furnace $f$, supported upon a boom $f^2$ within the cylinder $g$. This furnace will be of a construction well known in this art and would operate inside the cylinder $g$ to heat the same in connection with another gas-furnace $f^3$, which is movably mounted by the hanger $f^4$, so that it can be adjusted relative to the cylinder in any desired way. It is of course apparent that in place of the exact mounting of these furnaces which I have disclosed other means could be employed for supporting the furnaces in proper position relative to the seam to be welded.

The operation of my anvil is as follows: Suppose, for example, that it was desired to weld a circumferential seam between the cylinder $g$ and the head $g'$ just above the anvil, as the same is shown in Fig. 7. The seam would first be heated, and to accomplish this the anvil-support and anvil carried thereby are moved away from the end of the anvil-bar $b$ by operating the support-cylinder $c$ through its valve-lever $h^3$, which would be moved so as to admit fluid under pressure—that is to say, steam, compressed air, or any liquid under pressure—supplied through the pipe $c^7$ to the pipe $c^3$, and so to the outer end of the support-cylinder $c$, at the same time discharging the fluid from the inner end of the cylinder $c$ through the pipe $c^4$ and the discharge-pipe $c^8$. In this way the anvil-support and anvil are moved inward along the anvil-bar away from the seam to be welded. The furnace $f$ could then be thrust out to the seam, and in connection with some other heating means outside the cylinder $g$ such a gas-furnace would heat the seam to a welding heat. The furnace would then be quickly withdrawn from the seam and the anvil-support and anvil thrust out toward the outer end of the anvil-bar by operating the valve-lever $h^3$ so as to drive the piston $c'$ to the outer end of the cylinder $c$, as is shown in Fig. 7. The anvil of course up to this time would be in its lowered position, (shown in Fig. 1,) so as not to be in contact with the cylinder $g$. When the anvil is brought on its support directly under the seam to be welded, it would then be raised so as to support the seam by admitting fluid from the supply-pipe $c^6$ to the pipe $c^5$ by turning the valve-lever $h'$ in the proper direction, so that fluid under pressure, either steam, air, or some other operating fluid, is admitted to the chamber $b^5$, passes up through the passage $b^4$, and enters the anvil-cylinder $a^3$, thereby raising the anvil to any desired extent to support the seam to be welded. The welding could be done either by sledges in the hands of workmen or by any other means coöperating with the anvil within the cylinder $g$, but preferably by my air-hammer, which I will describe. The anvil-head $a'$ may have any desired contour, and in practice it is desirable to form a number of these heads, so that they can be varied as desired to suit the class of work to be performed. In practice I find in some cases that merely upon lowering the anvil and without moving it inward along the bar the furnace could be inserted against the seam. The movability of the anvil on the bar is, however, a very desirable feature for other purposes also. When this section of weld has been completed, the anvil may be lowered away from the seam by moving the valve-operating lever $h'$ so as to discharge the fluid within the anvil-cylinder through the passage $b^4$, the chamber $b^5$, and the pipe $c^5$ and discharge-pipe $c^9$. The weight of the anvil and anvil-cylinder will cause the fluid to escape in this manner, and the anvil will move downward of its own weight as far as desired. Some positive means of withdrawing the anvil could be provided, if desired. For instance, the anvil-cylinder could be arranged in connection with a double-acting piston, or suitable withdrawing-springs could assist the weight of the anvil and cylinder in moving the anvil toward the anvil-bar.

If compressed air is used as the fluid actuating the anvil, the anvil will be supported against the work with a yielding pressure, since the anvil can yield slightly under any increase of pressure upon it. For some classes of work this is a very desirable feature.

I have shown the cylindrical portion $b^2$ of the anvil-support $b'$ as projecting at right angles to the anvil-bar $b$. This exact construction is not necessary, and for some classes of work it would be desirable to have the part $b^2$ project at some other angle to the anvil-bar, and it may also be desirable to have the anvil mounted so as to move not in a vertical direction, but in some other direction in some cases.

*Air-hammer.*—In connection with my electric truck and air-anvil I employ an air-hammer for forming the weld.

Figures 8, 13, 14:
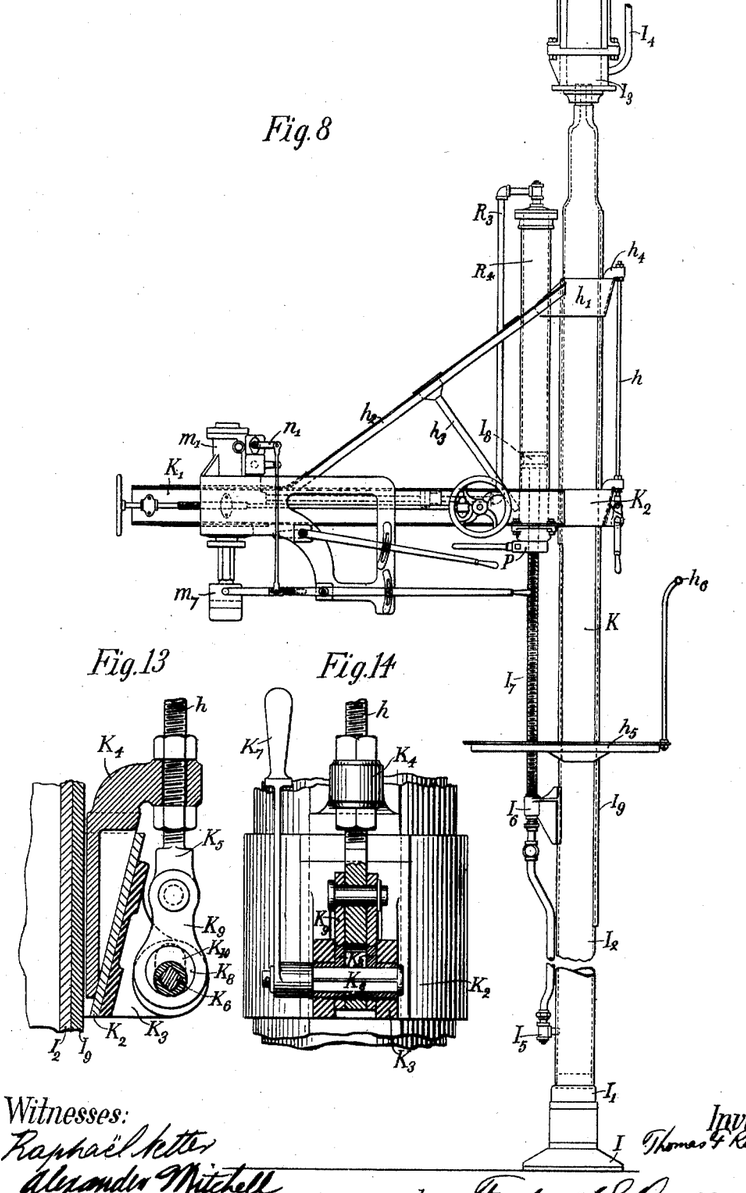
Fig. 8 is a view drawn on a larger scale, showing the hammer which I employ.
Figs. 13 and 14 are detail views showing the means of clamping the hammer-mounting to the supporting-column.

As seen in Fig. 8, upon a foundation or base plate I is revolubly mounted the supporting-column $I^2$, which has a bearing-piece $I'$ at the bottom of the same, which also has suitable bearings in the bracket $I^3$, attached to the ceiling or supported in any other similar way. A cylinder-tube K embraces the column $I^2$ and supports the hammer-boom $K'$. A heavy strap $K^2$ serves to surround the tube and is secured to the side members $K'$ of the hammer-boom, which are secured together at their outer ends by the brace $K^{12}$. At the top of the tube K there is attached a similar strap $h'$, which serves to support a bracing member $h^2$, which, in connection with a strut $h^3$, serves to brace the hammer-boom. Upon the lower end of the tube K is secured the operating-platform $h^5$, provided with a suitable guard-rail $h^6$.

Figures 9, 10, 11, 12:
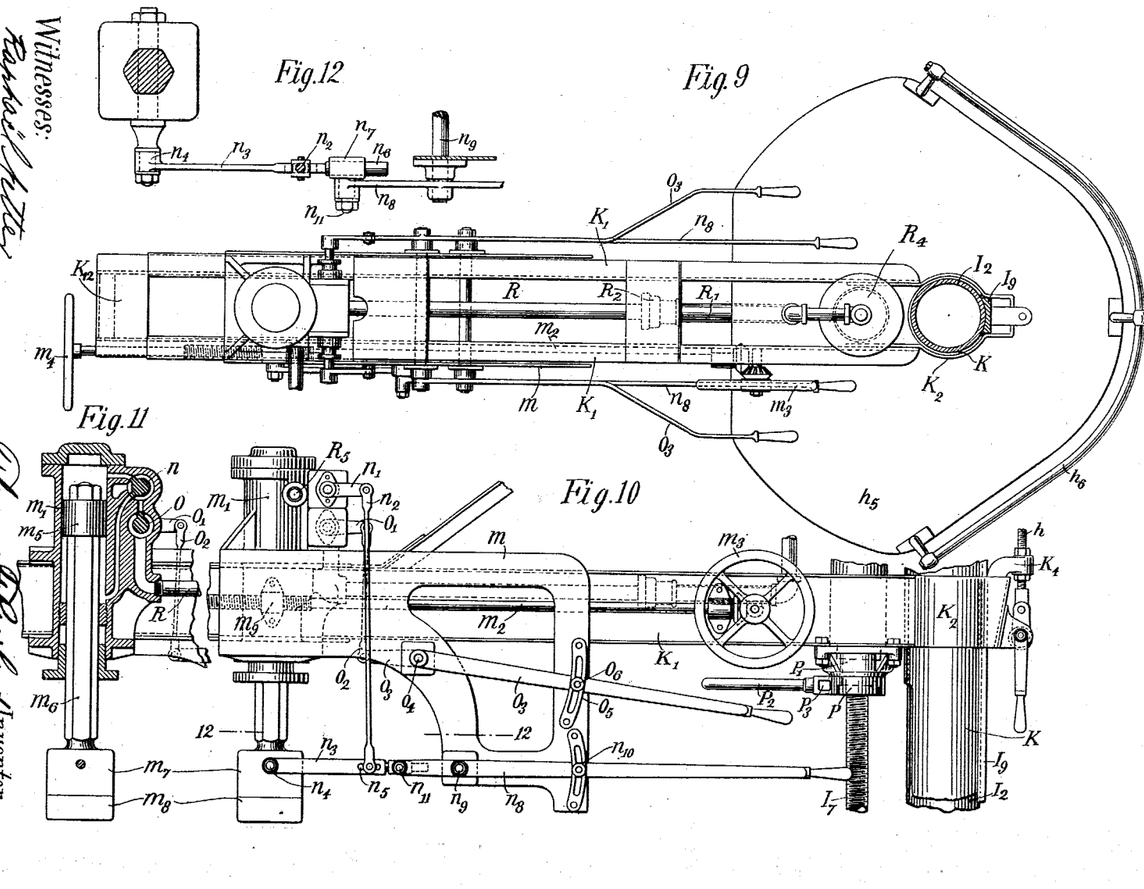
Fig. 9 is a top view, partly in section, of the same.
Fig. 10 is a side view of the hammer and parts of its mounting.
Fig. 11 is a central sectional view of the hammer-cylinder.
Fig. 12 is a detail view of the hammer, taken on the line 12 12 of Fig. 10.

As is seen in Fig. 10, the hammer-cylinder $m'$ is slidingly mounted upon the outer end of the hammer-boom and is supported thereon by side plates $m$. The hammer-cylinder $m'$ is provided with suitable admission-ports at either end which communicate with an automatic valve $n$, which governs these ports and also an intermediate exhaust-port which communicates with the valve-casing and which communicates with exhaust-pipe $R^5$. Within the cylinder $m'$ is the piston $m^5$, which is secured rigidly to the polygonal piston-rod $m^6$, working through a suitable stuffing-box in the lower end of the cylinder. Upon the lower end of the piston-rod is secured the hammer $m^7$, to which is rigidly secured the working hammer-face $m^8$. It is of course desirable that the hammer-face be varied to suit the particular character of work to be done, and a different hammer-face can be employed having the proper shape to suit the particular kind of work to be done.

The lever $n^3$ is pivoted about the pin $n^4$ in the hammer-head, and this lever is provided with a cylindrical extension $n^6$, (best shown in Fig. 12,) which slides through a guide-piece $n^7$, pivotally mounted about the pin $n^{11}$, which is in the end of the adjusting-lever $n^8$, rigidly secured to the rod $n^9$, which moves in suitable bearings. This lever can be held in any desired position by an adjusting-nut, which works in a well-known manner in the arc $n^{10}$. In this manner it will be evident that the center of oscillation of the lever $n^3$, the outer end of which moves with the hammer-head, can be varied by moving the adjusting-lever $n^8$. The valve-rod $n^2$ is secured at its upper end to the valve-arm $n'$, which is rigidly secured to the valve $n$. The lower end of this rod is pivoted in any one of a series of holes $n^5$ near the point of oscillation of the lever $n^3$. Instead of a number of holes it is evident that a slot could be formed in the end of the lever $n^3$ to take their place. In this way the hammer as it moves up and down actuates the admission-valve $n$, and the hammer is thus automatic. The amount of working fluid which is admitted at each stroke, and consequently the force of the blow which the hammer strikes, can be suitably varied by moving the adjusting-lever $n^8$, which varies the amount of working fluid which is admitted on the upper side of the hammer-piston. The throttle-valve $o$ governs the admission of working fluid to the valve $n$. This throttle-valve is rigidly secured to the valve-arm $o'$, and this arm is connected by a suitable link $o^2$ with the controlling-lever $o^3$, rigidly secured to the shaft $o^4$, which is mounted in suitable bearings in the frame-plate $m$. The position of the controlling-lever $o^3$ can be adjusted by the adjusting-nut $o^6$, working in connection with the arc $o^5$.

I have described the device as having a single adjusting-lever and controlling-lever. It will be noted, however, from Fig. 9 that there are two controlling-levers and two adjusting-levers, one on each side of the hammer-boom. Both controlling-levers, for instance, move together, because both levers $o^3$ are rigidly attached to the shaft $o^4$, and the same is true with regard to the adjusting-levers, both of which are fast to the shaft $n^9$.

The working fluid is supplied to the hammer-cylinder through the pipe R, as seen in Fig. 9, and this pipe passing through a suitable packing or stuffing box $R^2$ is adapted to telescope within the outer section of pipe R', so that the working fluid is always properly supplied to the hammer-cylinder whatever may be its position on the hammer-boom. The hammer-cylinder, together with the frame $m$, is moved along the hammer-boom by the adjusting-screw $m^2$, the threaded portion of which engages with a suitable nut $m^9$, secured to the hammer-casing $m$. At the outer end of the shaft of the adjusting-screw is secured a hand-wheel $m^4$, and at the inner end of this screw there is a suitable bevel-gear, which is driven through another coöperating gear by the hand-wheel $m^3$, so that the position of the hammer may be adjusted with respect to the boom either from the outer or the inner end of the boom. The working fluid is supplied through a pipe $I^4$, communicating with the interior of the supporting-column $I^2$ and passing therefrom through the pipe $I^5$ into the receiving-cylinder $R^4$. The pipe $I^5$ is supported by a bracket $I^6$, rigidly secured to the supporting-column $I^2$. The upper end of the supply-pipe at $I^7$ is threaded, as shown, and is engaged by a suitable nut P', which is mounted to rotate in a suitable bearing secured to the inner end of the hammer-boom by being bolted to both of the side plates K'. This nut is actuated by a double-acting ratchet P, the engaging pawl of which is regulated by the latch $P^3$, so that either of two pawls may be made to engage at will, so that the ratchet by oscillating the operating-handle $P^2$ will drive the nut in either direction. In this way the hammer-boom, together with the supporting-tube K, to which it is rigidly secured, may be raised to any desired height upon the supporting-column $I^2$. It will be noted that the supporting-tube is formed with slots on either side of the same, and, as seen from Fig. 9, the guiding fin or rib $I^9$, rigidly secured to the supporting-tube $I^2$, along one side of the same, runs in one of these slots. The other slot, formed in the opposite side of the tube, serves to accommodate the bracket $I^6$ when the hammer is lowered. It will be seen, therefore, that while the hammer, together with its boom and supporting-tube, may be moved longitudinally of the supporting-column $I^2$ it cannot rotate with respect to the same, although the whole structure, including the supporting-column, may be revolved about the axis of the latter.

The supporting-tube is clamped upon the supporting-column in the following way: In the two straps $K^2$ and $h'$ act the two wedges $K^4$ and $h^4$, which when pressed down wedge the straps away from the guiding-rib $I^9$, and so clamp the two straps rigidly to the supporting-column. Both of these wedges are secured by a suitable set of nuts to the wedge-rod $h$, and this rod, as is seen in Fig. 13, has formed integral therewith, at its lower end, the expanded portion $K^5$. Upon the lower strap $K^2$ is secured the bracket $K^3$, upon which is revolubly mounted the square axle $K^6$, provided with a suitable operating-handle $K^7$, rigidly secured thereto. Upon this shaft are mounted to revolve therewith two eccentrics $K^8$, which are adapted to engage with two straps $K^9$, pivoted to the extension $K^5$. It will be noted that the square shaft passes through a slot $K^{10}$ in the extension $K^5$, and thereby prevents the lateral displacement of the wedge-rod $h$. If the handle $K^7$ is thrown downward, as is indicated in Fig. 8, the eccentrics will draw the wedge-rod $h$ down, thereby forcing both the wedges into operative position to firmly clamp the supporting-tube and hammer-boom rigidly to the supporting-column. When the operating-handle is moved into the position shown in Fig. 14, the wedge-rod $h$ is raised, withdrawing the wedges from engagement and releasing the supporting-tube, so that it can be raised or lowered by the ratchet-handle $P^2$. The upper end of the supply-pipe $I^7$ is provided with the piston $I^8$, which fits tightly within the supply-chamber $R^4$, and it will be seen that when there is a pressure of working fluid within this chamber the chamber will be raised by reason of the unbalanced pressure acting against the upper end of this chamber. By this means it is possible to counterbalance the weight of the hammer-boom and its attached parts as desired.

It is not necessary to employ the exact form of hammer-actuating mechanism which I have shown. Any equivalent form of actuating means could be used which would operate the hammer. Furthermore, the hammer might be mounted instead of parallel to the vertical supporting-column $I^2$ at an angle to the vertical, either in the plane of the supporting-column or in some other plane. This would adapt it to act in connection with work which was curved. It may also be desirable in some cases to clamp the supporting-column $I^2$, so as to prevent its rotation at certain times during the operation of my device, and such clamping means could readily be supplied by those skilled in this art. It is possible, instead of having the entire supporting-column rotate about its axis, to mount the hammer-boom upon a sleeve rotatably mounted upon said supporting-column, or, indeed, other means might be provided to rotate it about the axis of the support.

From the foregoing description it will be seen, therefore, that my air-hammer may be revolved, together with all its attached parts, including the supporting-column I², about the axis of the latter. The hammer-boom carrying the hammer may be raised and lowered by operating the ratchet-handle controlling the ratchet P and that these parts may be rigidly clamped in position with relation to the supporting-column I². The position of the hammer along the hammer-boom may be regulated by the adjusting-screw, which feeds the hammer outward or inward under the action of the hand-wheels. The hammer may be operated most readily from the operating-platform $h^5$. The controlling-lever admits fluid-pressure—either compressed air, steam, or any other working fluid—to the operating-valve $n$. The action of the hammer at once becomes automatic if the controlling-lever is properly set, and by operating the controlling-lever the intensity of the strokes of the hammer may be suitably varied.

In using my welding apparatus in welding, for instance, a longitudinal seam in the tubes $g$ a short section of the seam in one of these tubes would be heated by the coöperating gas-furnaces $f$ and $f^3$, which supply heat to the tube both inside and outside of the seam. When the proper heat has been attained, the furnaces are moved out of position. The air-anvil is moved along the anvil-bar to bring the anvil directly under the part of the seam to be welded, as described. The anvil is thereupon raised into contact with the under side of the seam, as has been stated in detail, and then the hammer is moved into position by swinging it about the supporting-column so that the hammer is exactly over the anvil. It is thereupon actuated, and its blows serve to weld the seam and also to straighten the plates forming the tube, so as to prevent any distortion which might otherwise occur by reason of welding. While the seam on one of these tubes is being worked, a section of seam of the other, as shown in Fig. 1, has been heated, and when the heat has been secured the hammer is swung across, together with its supporting-column, until it is in proper position to weld the seam on the second tube. After a section of seam has been welded the electric truck moves the tube, which is of course released from contact with the anvil by lowering the latter, so that a fresh part of the seam is brought over the anvil-face. This is thereupon heated and welded in a similar manner. In welding circumferential seams the tube is of course rotated in the direction of the seam by the traverse-rolls B on the truck upon which the tube is supported.

While I have described my invention as particularly applicable to the welding of large tubes, I do not wish to be confined to its use in this connection, since manifestly the apparatus which I have described may be used in shaping large tubes or other metal structures and is useful for riveting and for other operations.

It is manifest that instead of mounting an air-hammer upon the boom which I show any other tool might be mounted in this way and might be operated in any desired manner by fluid-pressure, by shafting, or by electrical means from the supporting-column. Furthermore, parts of my invention may be used separately and may be employed in connection with other equivalent devices. I do not, therefore, wish to be limited by the exact disclosure of my invention; but the exact scope of what I claim to be new is pointed out in the annexed claims.

What is claimed as new is—

1. In welding apparatus, two tracks, means upon each of said tracks to support an article to be welded, a movable anvil to operate within each of said articles, a hammer, means to actuate said hammer and means to movably support said hammer so that it may coact with either anvil.

2. In welding apparatus, two tracks, a truck upon each of said tracks to support a tube to be welded, means to traverse said tubes on said trucks and means to move said trucks and said tubes along said tracks, an anvil-bar extending into each of said tubes, an anvil mounted upon said bar, means to move said anvil along said bar, means to move said anvil away from said bar, a hammer, a supporting-tube revolubly mounted between said tracks, a hammer-boom upon which said hammer is movably mounted secured to said tube, said tube being vertically adjustable, so that said hammer may coact with either anvil to operate upon either tube.

3. In welding apparatus, an anvil, means to support said anvil, means to move said anvil, a supporting-tube, means to support said tube to turn about its axis, means to move said tube longitudinally, a hammer-boom secured to said tube, an automatic hammer mounted upon said boom, means to slide said hammer along said boom to coöperate with said anvil.

4. In welding apparatus, an anvil-bar, an anvil slidably movable along said bar, means to move said anvil along said bar, means to move said anvil away from said bar, a supporting-tube, means to support said tube to turn about its axis, a hammer-boom secured to said tube, a hammer slidably mounted on said boom to coact with said anvil and means to actuate said hammer.

5. In welding apparatus, an automatic hammer, a supporting-tube upon which said hammer is firmly secured and movably mounted, means to support said tube to turn about its axis, means to actuate said hammer, means to support an article to be welded, means to feed said article relative to said supporting-tube and an anvil to support said article to act in connection with said hammer.

6. In welding apparatus, a supporting-column revolubly mounted to turn about its axis, a hammer-boom supported on said column and a hammer adjustably and firmly mounted on said boom.

7. In welding apparatus, a supporting-column mounted to turn about its axis, a supporting-tube embracing said column, a hammer-boom secured to said supporting-tube, a hammer mounted upon said boom and means to adjust the position of said hammer relative to said boom.

8. In welding apparatus, a supporting-column, a supporting-tube embracing said column, a hammer-boom secured to said supporting-tube, a fluid-operated hammer mounted upon said hammer-boom, means to adjust the position of said hammer relative to said boom, means to supply operating fluid to said hammer and means to adjust the position of said supporting-tube relative to said column.

9. In welding apparatus, a supporting-column, a supporting-tube mounted to slide longitudinally upon said column, means to slide said tube on said column, means to clamp said tube to said column, a boom secured to said tube, an automatic hammer mounted upon said boom, means to move said hammer on said boom and fluid means to operate said hammer, said operating means being transmitted through said column.

10. In welding apparatus, a tubular supporting-column, bearings in which said column is mounted to rotate about its axis, means to support an operating-tool from said column, means to move said tool longitudinally of said column, means to move said tool radially with respect to said column, fluid means to actuate said tool, means to transmit said actuating fluid through said column from the bearings thereof.

11. In welding apparatus, a supporting-column mounted to turn about its axis, said column being tubular, a supporting-tube movable longitudinally of said column, a boom secured to said tube, a fluid-actuated tool mounted upon said boom, means to supply fluid to said tool from said column and to counterbalance the weight of said boom and said tool.

12. In welding apparatus, a tubular supporting-column mounted to turn about its axis, a supporting-tube longitudinally movable upon said column, a boom secured to said tube, a fluid-actuated tool mounted upon said boom, a fluid-receiving chamber mounted upon said boom, a fluid-supply tube entering said chamber, a piston upon said fluid-supply tube fitting said chamber whereby said fluid tends to lift said fluid-receiving chamber.

13. In welding apparatus, a tubular supporting-column, bearings for said column in which it is mounted to turn about its axis, a supporting-tube mounted upon said column, a guiding-rib secured to said column and engaging said supporting-tube, a boom secured to said tube, a fluid-actuated tool mounted upon said boom, means to supply fluid to said tool from the bearings of said column, said means including a fluid-receiving chamber upon the end of which is exerted an unbalanced fluid-pressure tending to lift said chamber, a wedge to clamp said supporting-tube to said column and manual means to operate said wedge.

14. In welding apparatus, a clamping device consisting of a clamping-wedge, a rod secured to said wedge, a slot being formed in the end of said rod, an operating-shaft passing through said slot, an eccentric on said shaft and an eccentric-strap engaging said eccentric connected with said rod.

15. In welding apparatus, a supporting-column, a supporting-tube mounted upon said column, a guiding-rib secured to said column and engaging said tube, an operating-tool mounted upon said tube, means to move said tube upon said column, a wedge to clamp said tube to said column and a manually-operated eccentric to operate said wedge.

16. In welding apparatus, a clamp consisting of a clamping-wedge, a rod adjustably secured to said wedge, there being a slot formed in the end of said rod, a square operating-shaft passing through said slot, a pair of eccentric-straps removably connected to said rod on either side of the same, two eccentrics engaging said eccentric-straps mounted on either side of said rod, said eccentrics having squared openings therein and circular journals at one side thereof, and rigid bearings in which said journals operate whereby said clamping device may be readily assembled.

17. In welding apparatus, a supporting-column, bearings for said supporting-column in which it is mounted to turn about its axis, a supporting-tube mounted upon said column, a guiding-rib secured to said column engaging said tube, a hammer-boom secured to said tube, a fluid-operated hammer mounted upon said boom, means to move said hammer longitudinally of said boom, means to supply fluid to said hammer from the bearings of said column, a fluid-receiving chamber secured to said boom, a fluid-supply tube, screw-threads formed upon said supply-tube, a nut engaging said screw-threads, said nut being revolubly mounted on said boom and means to operate said nut in either direction.

18. In welding apparatus, an anvil-bar, an anvil slidably movable along said bar, means to move said anvil along said bar, means to move said anvil away from said bar, a supporting member, means to rotatably support said member, a hammer-boom secured to said member, a hammer slidably mounted on and firmly secured to said boom to coact with said anvil and means to actuate said hammer.

19. In welding apparatus, an anvil, means to support said anvil, means to move said anvil, a supporting member, means to support said member rotatably, means to move said member longitudinally along its axis of rotation, a hammer-boom secured to said member, an automatic hammer mounted upon and firmly secured to said boom, means to slide said hammer along said boom to coöperate with said anvil.

20. In welding apparatus, an automatic hammer, a supporting member upon which said hammer is movably mounted and firmly secured, means to support said member rotatably, means to actuate said hammer, means to support an article to be welded, means to move said article relative to said supporting member and means to support said article in connection with said hammer.

21. In welding apparatus, a supporting-column mounted to turn about its axis, a supporting member mounted upon said column, a hammer-boom secured to said supporting member, a hammer firmly mounted upon said boom and means to adjust the position of said hammer relative to said boom.

22. In welding apparatus, an anvil, means to support said anvil, means to move said anvil, a supporting member mounted to turn about its axis and to move longitudinally of its axis, a hammer-boom secured to said supporting member, an automatic hammer firmly mounted upon said boom to slide along said boom and coöperate with said anvil.

23. In welding apparatus, an automatic hammer to operate upon the outside of an article to be welded, a supporting member upon which said hammer is movably mounted and firmly supported, said supporting member being angularly and longitudinally movable, an anvil movably mounted to operate inside said article, and trucks to support said article and to feed the same with respect to said anvil.

24. In welding apparatus, an automatic hammer to operate upon the outside of an article to be welded, a supporting-column upon which said hammer is movably mounted, said column being angularly movable, means to support an article to be welded, means to feed said article with respect to said supporting-column and an anvil to support said article to be welded and to operate in connection with the hammer.

THOMAS F. ROWLAND.

Witnesses:
WARREN E. HILL,
AGNES A. MORROW.